United States Patent
Podgorny et al.

(10) Patent No.: US 10,810,378 B2
(45) Date of Patent: Oct. 20, 2020

(54) METHOD AND SYSTEM FOR DECODING USER INTENT FROM NATURAL LANGUAGE QUERIES

(71) Applicants: Igor Podgorny, San Diego, CA (US); Faraz Sharafi, San Diego, CA (US); Matthew Cannon, San Diego, CA (US); Vitor Carvalho, San Diego, CA (US)

(72) Inventors: Igor Podgorny, San Diego, CA (US); Faraz Sharafi, San Diego, CA (US); Matthew Cannon, San Diego, CA (US); Vitor Carvalho, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 140 days.

(21) Appl. No.: 16/170,585

(22) Filed: Oct. 25, 2018

(65) Prior Publication Data

US 2020/0134019 A1 Apr. 30, 2020

(51) Int. Cl.
*G06F 40/30* (2020.01)
*G06N 3/08* (2006.01)
*H04L 29/08* (2006.01)
*G06F 16/2457* (2019.01)

(52) U.S. Cl.
CPC ........ *G06F 40/30* (2020.01); *G06F 16/24575* (2019.01); *G06N 3/08* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 9,923,931 B1* | 3/2018 | Wagster | ............... | H04L 63/30 |
| 2007/0061301 A1* | 3/2007 | Ramer | ............... | G06F 16/248 |
| 2007/0061335 A1* | 3/2007 | Ramer | ............... | G10L 15/26 |
| 2007/0260635 A1* | 11/2007 | Ramer | ............... | H04L 67/2823 |
| 2010/0023514 A1* | 1/2010 | Parikh | ............... | G06F 40/242 |
| | | | | 707/E17.001 |
| 2014/0219563 A1* | 8/2014 | Rodriguez-Serrano | ............... | |
| | | | | G06K 9/18 |
| | | | | 382/182 |

(Continued)

OTHER PUBLICATIONS

Seungwhan Moon et al., "Multimodal Named Entity Recognition for Short Social Media Posts"; Language Technologies Institute, Carnegie Mellon University; Snap Research; Intuit; arXiv:1802.07862v1; Feb. 22, 2018 (9 pages).

*Primary Examiner* — Fariba Sirjani
(74) *Attorney, Agent, or Firm* — Ferguson Braswell Fraser Kubasta PC (57) ABSTRACT

A method for decoding a natural language user query involves obtaining the user query submitted by a user, segmenting the user query into words, generating a character embedding for each of the words, and generating a word embedding for each of the words. The method further involves obtaining a clickstream from tracked clicks of the user, generating a clickstream embedding from the clickstream, and for each of the words, generating a unified feature representation based on the character embedding and the word embedding for each of the words, and the clickstream embedding. The method also involves decoding the unified feature representations to obtain a decoded user query, and processing the user query using the decoded user query.

20 Claims, 6 Drawing Sheets

(56) References Cited

U.S. PATENT DOCUMENTS

| | | | |
|---|---|---|---|
| 2015/0310862 A1* | 10/2015 | Dauphin | G06F 40/30 704/257 |
| 2018/0025010 A1* | 1/2018 | Ramer | G06F 16/7867 707/727 |
| 2018/0157664 A1* | 6/2018 | Howell | G06F 40/20 |
| 2019/0034484 A1* | 1/2019 | Das | G06N 3/08 |
| 2019/0122651 A1* | 4/2019 | Arik | G10L 13/027 |
| 2019/0188295 A1* | 6/2019 | Sirotkovic | G06F 16/2425 |
| 2019/0213480 A1* | 7/2019 | Lim | G06F 40/10 |
| 2019/0236132 A1* | 8/2019 | Zhu | G06N 20/20 |
| 2020/0005503 A1* | 1/2020 | He | G06F 40/30 |
| 2020/0050667 A1* | 2/2020 | Lin | G06F 40/30 |

* cited by examiner

METHOD AND SYSTEM FOR DECODING USER INTENT FROM NATURAL LANGUAGE QUERIES

BACKGROUND

When a user is using a software application, users often want to perform a search about a topic to obtain information. To perform the search, the user inputs a user query that is in a natural language. Such a user query may be, for example, a spoken or typed question or command A user query may thus have the structure of a user's language. For example, the user query may be a standard natural language query. The user query may deviate from the user's language. For example, the natural language query may include typos, may include jargon, etc. Further, the user query may be a non-standard natural language query. The search engine performs a search based on the user query. A general challenge exists in having the computer system determine the user's intent by the user query and return search results that are responsive to the user's intent when the user's intent may not be accurately reflected in the query.

SUMMARY

In general, in one aspect, one or more embodiments relate to a method for decoding a natural language user query. The method includes obtaining the user query submitted by a user, segmenting the user query into words, generating a character embedding for each of the words, and generating a word embedding for each of the words. The method further includes obtaining a clickstream from tracked clicks of the user, generating a clickstream embedding from the clickstream, for each of the words, generating a unified feature representation based on the character embedding and the word embedding for each of the words, and the clickstream embedding. The method also includes decoding the unified feature representations to obtain a decoded user query, and processing the user query using the decoded user query.

In general, in one aspect, one or more embodiments relate to a system for decoding a natural language query. The system includes a computer processor, an application back end, a query decoder, and a query response engine executing on the computer processor. The application back-end obtains the user query submitted by a user, segments the user query into words, generates a character embedding for each of the words, generates a word embedding for each of the words, obtains a clickstream from tracked clicks of the user, and generates a clickstream embedding from the clickstream. The query decoder generates a unified feature representation for each of the words, based on the character embedding and the word embedding for each of the words, and the clickstream embedding. The query decoder further decodes the unified feature representations to obtain a decoded user query. The query response engine processes the user query using the decoded user query.

In general, in one aspect, one or more embodiments relate to a non-transitory computer readable medium including computer readable program code for causing a computer system to obtain a user query submitted by a user, segment the user query into a plurality of words, generate a character embedding for each word of the plurality of words, generate a word embedding for each word of the plurality of words, obtain a clickstream from tracked clicks of the user, and generate a clickstream embedding from the clickstream. The computer readable program code further causes the computer system to generate a unified feature representation for each of the words based on the character embedding and the word embedding for each of the words, and the clickstream embedding. The computer readable program code also causes the computer system to decode the unified feature representations to obtain a decoded user query, and process the user query using the decoded user query.

Other aspects of the invention will be apparent from the following description and the appended claims.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide methods and systems for extracting user intent from natural language-based user queries. Users of software applications may communicate with the software applications using queries. A user query may be, for example, a spoken or typed question or command. A user query may have the characteristics of a user's language, including vocabulary, grammar, etc. However, a user query may also deviate from ideal characteristics of the language. For example, the user query may have spelling and grammatical mistakes, and include colloquial language, slang, idiomatic expressions. Generally speaking, a submitted user query may be noisy or otherwise ill-defined. Thus, the user query may be a nonstandard natural language-based user query. Configuring a computer to extract user intent from a user query when the user query may be a standard or non-standard natural language-based user query may be particularly difficult.

One or more embodiments is directed to obtaining a decoded user query from the initially received user query. The decoded user query is assumed to represent the intent of the user when the user submitted the user query. Consider, for example, a scenario in which search rankers are used to provide answers to user support requests. In the example, shown in FIG. 5, multiple search rankers are used to allow specialization. Each of the multiple search rankers may access a data repository to obtain a response to user support requests. The specialization may be based on, for example, language (e.g., U.S. English, British English, French, Canadian French, etc.), software application or product type (e.g., when different software applications are provided by a software platform), product version (e.g., a free trial version, a basic version, a deluxe version), etc. The obtaining of the decoded user query from the initially submitted user query may be performed in real-time or in near real-time to provide the user with a timely response. The user query may be submitted using a conversational user interface using either typed or spoken language, thus further complicating the decoding of the user query.

In view of the above, it may be non-trivial to decode the user query and to select the proper search ranker that is most likely to provide a satisfactory response, based on the decoded user query.

In one or more embodiments of the disclosure, the decoded user query is obtained using machine learning models that operate not only on the submitted user queries, but also include the context of the user query. The additionally available context may increase the accuracy of the decoding of the user query. The context may include, for example, clickstream data and/or metadata, as discussed below. The use of multiple modalities, such as the user query itself, clickstream data and/or metadata, to accurately decode the user query is subsequently discussed. First, a system for decoding user queries, in accordance with one or more embodiments, is described, and subsequently, methods for decoding user queries, in accordance with one or more embodiments, are described.

Figure 1:
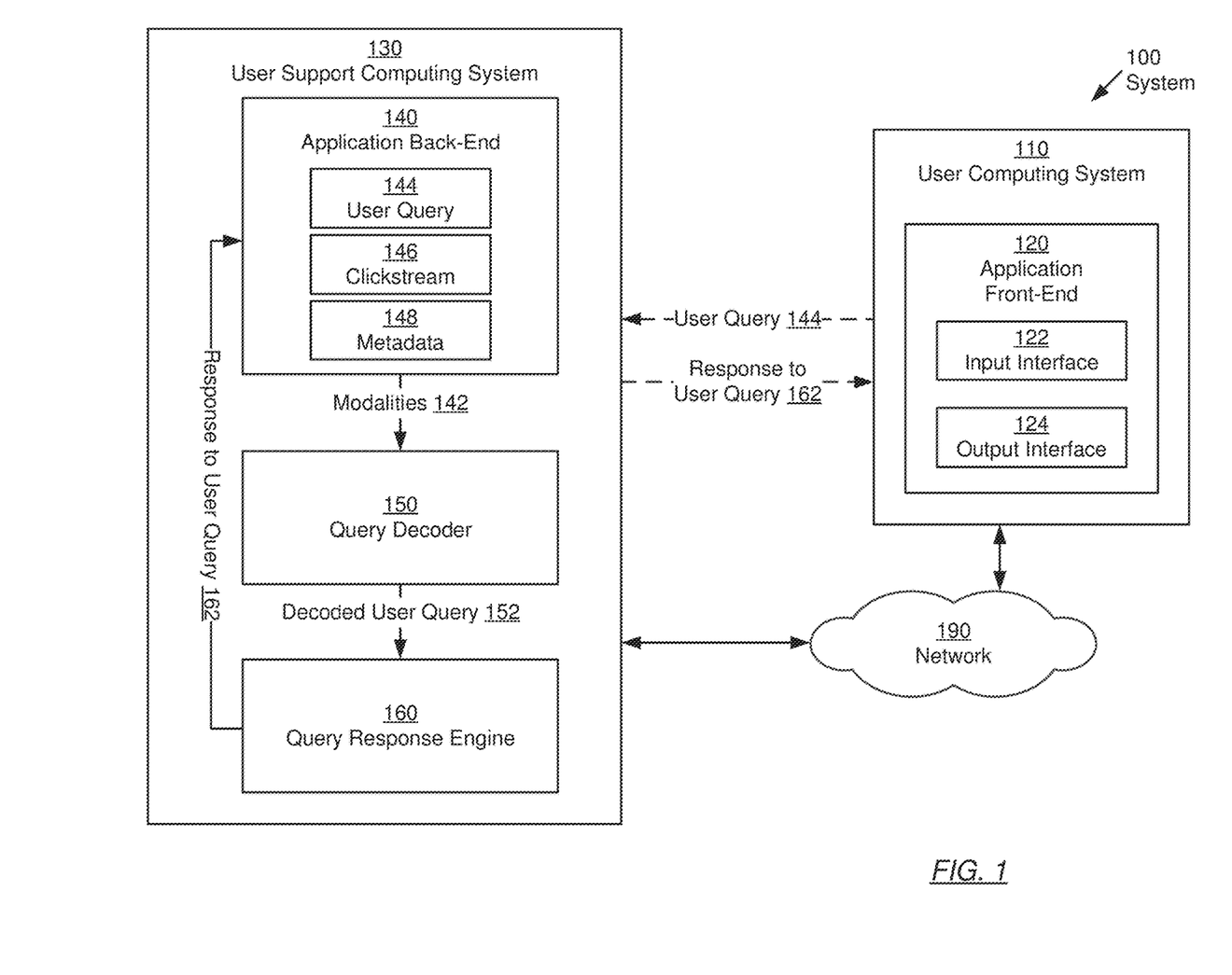
FIG. 1 shows a system for extracting user intent from natural language-based user queries in accordance with one or more embodiments of the disclosure.

Turning to FIG. 1, a system (100), in accordance with one or more embodiments of the disclosure, is shown. The system may include a user computing system (110), a user support computing system (130) and a network (190). The combination of the user computing system (110) and the user support computing system (130) may execute one or more software applications (not shown). Each of these components is subsequently discussed.

The user computing system (110) may enable a user to access the one or more software applications via an application front-end (120). The software application may provide one or more functionalities to support, for example, accounting tasks, tax calculation tasks, administrative tasks, multimedia tasks, social network tasks, etc. The software application may perform any task that involves some degree of interaction with a user. The computing device (110) may be a portable or a non-portable device such as a desktop personal computer, a laptop, a tablet computer, a smartphone etc. An example of a computing system, in accordance with one or more embodiments, is provided in FIGS. 6A and 6B. Any number of user computing systems (110) may be part of the system (100).

In one or more embodiments, the user computing system (110) hosts the application front-end (120). The application front-end (120) may provide a user interface enabling the user to access functionality provided by the software application. While some, most, or all functionality of the software application may be implemented by the application back-end (140) on the user support computing system (130), the application front-end (120), in accordance with one or more embodiments, makes the functionality accessible to the user. The application front-end may, thus include graphical or other user interfaces. The application front-end (120) may be a standalone executable application or a browser-hosted application, a smartphone or tablet app, or any other application capable of providing an interface to the application back-end (140). The application front-end (120) may provide the user with one or more input interfaces (122). An input interface may be for spoken and/or typed language. Other input interfaces may be provided in the form of dialog boxes, check boxes, etc. The application front-end (120) may further provide the user with output interfaces (124) such as text boxes, charts, graphs, animations, etc. Those skilled in the art will appreciate that the configuration of the application front-end (120) may depend on the purpose and/or configuration of the software application and may vary without departing from the disclosure.

In one or more embodiments, the application front-end (120) is configured to receive, via the input interface (122) of the application front-end (120), from the user, a user query (144), which may be forwarded to the application back-end (144) for further processing. The user query (144) may be provided in any format, including, but not limited to spoken and/or typed language. The user query may represent a user's intent. For example, the user may submit the user query (144) to research some information, to obtain technical support, to instruct the software application to perform one or more operations, etc. Broadly speaking, the user query may thus include search requests or requests for information and/or commands. The user query may be provided using typed and/or spoken natural language. However, the user query may deviate from standard natural language. For example, the user query may include typographical and/or grammatical errors, jargon, vernacular language, mispronunciations, etc. Further, the user query may be ambiguous, when analyzed without context (for example, the query may include the term "monopoly" which may refer to an economic situation or a game).

In one or more embodiments, the application front-end (120) is further configured to provide, via the output interface (not shown) of the application front-end (120), to the user, a response to the user query (162). The response to the user query (162) may be a result of the processing of the user query (144) by the user support computing system (130), as further described below. The response to the user query may include, for example, one or more search results, one or more answers to a question, a result of an operation, such as a number in case of a numerical operation, a chart, a graph, etc.

Continuing with the discussion of FIG. 1, the user support computing system (130) may be a computing system such as the computing system described with reference to FIGS. 6A and 6B. The user support computing system (130) may include one or more local servers or may be cloud based.

In one or more embodiment, the user support computing system (130) provides an application back-end (140) for the one or more software applications that are being accessed by user via the application front-end (120) on the user computing system (110). As previously noted, the software applications, in accordance with one or more embodiments, are not limited to providing a particular functionality. For example, the software application may provide one or more functionalities in the domains of word processing, accounting, tax preparation, record keeping, multimedia, gaming, etc. Accordingly, the back-end may include or provide access to databases, processing capabilities, etc., as needed by the software application.

In one or more embodiments, the application back-end (140) receives the user query (144). As previously noted, the user query (144) may be provided in natural language and may further deviate from standard natural language. Accordingly, the application back-end (140) may be unable to directly interpret the user query (144). Accordingly, the application back-end (140) may forward the user query (144) to a query decoder (150) to obtain a decoded user query (152) from the user query (144). The decoded user query (152) is assumed to reflect the user's intent underlying the user query.

In one or more embodiments, the decoded user query (152) is obtained from the user query (144) in view of a context. The context may consist of information that may be directly or indirectly related to the user query. Context may include, but is not limited to, user activity obtained from a clickstream, information about the user (such as a user profile), information having been provided by the user, the software application being used, a particular module (such as a page or pages) of the software module being accessed, obtained from metadata, etc. The context may improve the accuracy of the decode, for example, by allowing the resolution of ambiguities. Consider the previously introduced example of a user query that includes the term "monopoly". While the term, when considered without context, may refer to a game or an economic condition, a disambiguation may be performed when the context in which the term "monopoly" appears is considered. For example, if the term "monopoly" is used in an accounting context, the likeliness of the term "monopoly" referring to an economic condition increases, whereas the likeliness of the term "monopoly" referring to a game decreases. In one or more embodiments, the context includes a clickstream (146) and/or metadata (148). The clickstream (146) and metadata (148) and their contribution to decoding the user query are subsequently discussed.

The clickstream (146) may be collected by the application back-end (140) as a user is navigating through the software application. The clickstream (146) may document interactions of a user with the software application. For example, the clickstream (146) may include a history of page clicks and/or text inputs performed by the user to track the user's interaction with the software application. A user activity may, thus, be documented by storing an identifier for the user activity in the clickstream. The level of detail of user activity documented in the clickstream may vary. For example, while in some scenarios, the clickstream may document any or almost any user activity, in other scenarios, not all user activities may be documented. For example, privacy requirements may exclude text typed by the user or other sensitive data from the clickstream. Further, the granularity of the clickstream may vary. In some scenarios, each user activity may be documented, whereas in other scenarios, only summaries of user activities may be documented. For example, counts of clicks may be stored in the clickstream rather than the individual clicks. In some embodiments, page identifiers for pages or screens that the user has accessed may be documented in the clickstream. The clickstream (146) may be processed, for example, by performing a statistical analysis of the clickstream. The statistical analysis may provide insights into the user's behavior and/or interest. For example, a high number of clicks and/or significant time spent on a financial topic may indicate that this financial topic is of particular interest to the user. The clickstream (146) may, thus, provide context for the decoding of the user query.

In one embodiment, a series of screen IDs are collected as the clickstream when a user navigates through a software application, thereby accessing a series of screens or pages of the software application. The following example is based on four screens of a tax software application being sequentially accessed. The screen IDs are stored in the array with screen IDs such as ["incomeexplore", "s1040perbfdi8858", "2017deductionscredits", "deductionsguideme"]. The array may have a set size and may be limited to, for example, the 4, 5, or 20 most recent screen IDs. "Null" values may be entered initially, before the user begins accessing the software application, and these null values may be replaced by actual screen IDs as the user is accessing screens of the software application. The collected screen IDs forming the clickstream are categorical variables and may, thus, directly serve as the input to the query decoder (150). Alternatively, the screen IDs may be transformed into another representation using any kind of alphanumerical encoding to identify the screens that were accessed by the user.

Similarly, metadata (148) may also be collected by the application back-end (140) as the user is navigating through the software application. Metadata (148) may include identifiers of pages accessed by a user and may further include any data that may be obtained from these pages. For example, a page may include objects, e.g., JavaScript object or other objects. Each of these objects may have properties and may be associated with methods. Any information that is obtainable from these objects may be collected as metadata (148). Assume, for example, that one object is established for a user's personal information. Accordingly, the metadata (148) obtained from this object may include, for example, the income of the user, marriage status, age, location, etc. More specifically, consider an example in which the software application is a tax preparation software. When a W-2 Internal Revenue Service tax form is processed by the software application, some or all information obtainable from the W-2 form may be processed as metadata. This may include, but is not limited to, wages, tips, other compensation, federal income tax withheld, etc.

Metadata may be recorded as the metadata is being entered. The recording may also occur over multiple sessions. For example, in the tax preparation software scenario, a user may initially enter personal information on one day and may later, on another day, enter W2 information. The metadata may be stored in an array, as previously described for the clickstream. The array may have a set size and may be limited to, for example, the 20 most recently obtained metadata entries.

To provide an example for the utility of the metadata, (148), metadata associated with a software application may be beneficial to assess what topics of a task have already been completed by the user. The topics of the completed task may provide an insight into what topic a user may be interested in, when submitting the user query, thereby providing useful context. For example, it has been observed that users frequently submit user queries directed to a topic that has not yet been accessed by the user, when operating the software application. In one or more embodiments, the metadata (148) is collected along with the clickstream (146), as the user navigates through the software application. Accordingly, the metadata (148) may be considered part of the clickstream (146).

Using the clickstream (146) and/or the metadata (148), entire workflows and/or histories may be obtained, providing a rich context that may facilitate the obtaining of the decoded user query (152). The combination of the user query (144), the clickstream (146) and/or the metadata (148) are included in the modalities (142) that are provided to the query decoder (150).

The query decoder (150), in accordance with one or more embodiments of the disclosure, includes a set of machine-readable instructions (stored on a computer-readable medium) which when executed enable the query decoder to make a prediction of the user intent underlying the user query by obtaining the decoded user query (152), based on the modalities (142). The decoded user query (152) may subsequently be provided to the query response engine (160). A description of the query decoder (150), the modalities (142) and the decoded user query (152) is provided below with reference to FIG. 2 describing the query decoder, and with reference to FIG. 3 describing a method for obtaining a decoded user query.

The query response engine (160), in accordance with one or more embodiments, performs an action in response to the submitted user query (144). More specifically, the action by the query response engine (160) is based on the decoded user query (152). The query response engine (160) may be, for example, a search engine, or any other type of engine capable of responding to the query as further discussed below.

The action by the query response engine may include an operation such as a search. Assume, for example, that the user query (144) is a support request that was submitted by a user of the computing system (110). Accordingly, the decoded user query (152) represents the support request as understood by the query decoder (150), in a feature space that allows processing of the support request. For example, the decoded user query (152) may express the support request in a high-dimensional vector generated by the query decoder (150).

In one or more embodiments, the query response engine (160) includes multiple search rankers configured to identify responses to the support request represented by the decoded user query (152). Each of the search rankers may be specialized. For example, a search ranker may be specialized to process search queries directed to a specific software application, a specific version of the software application, a specific language. While this specialization of the search rankers may result in higher quality responses to search queries, the specialization may, on the other hand necessitate that a search query is directed to one or more specific search rankers with the best ability to respond to the search query. Such an orchestration of search rankers may be performed based on the features represented by the decoded user query. For example, if the decoded user query (152) indicates that the user query is directed to a particular tax form that is specific to the United States Internal Revenue Service, the user query may be directed to a search ranker that is specialized in tax forms completed in U.S. English. The selected search ranker may subsequently perform the search based on the user query and may return one or more search results that may be ranked. The ranking may be performed based on relevance or based on other criteria. The search result(s) may subsequently be returned as the response to the user request (162), via the application back-end (140) and the application front-end (120).

While the above paragraphs describe a scenario in which the user query includes a search request, those skilled in the art will appreciate that the user query may alternatively include other content. For example, the user query may include instructions for performing a computational operation, to complete a form, etc. The query response engine (160) may include appropriate components to perform these operations.

Continuing with the discussion of the system (100), shown in FIG. 1, the network (190) communicatively connects the user computing system(s) (110) and the user support computing system (130). The network (190) may include any combination of wired and/or wireless segments which may include the Internet. The communications between the user computing system(s) (110) and the user support computing system (130) may include any combination of secured and non-secured communications.

Figure 2:
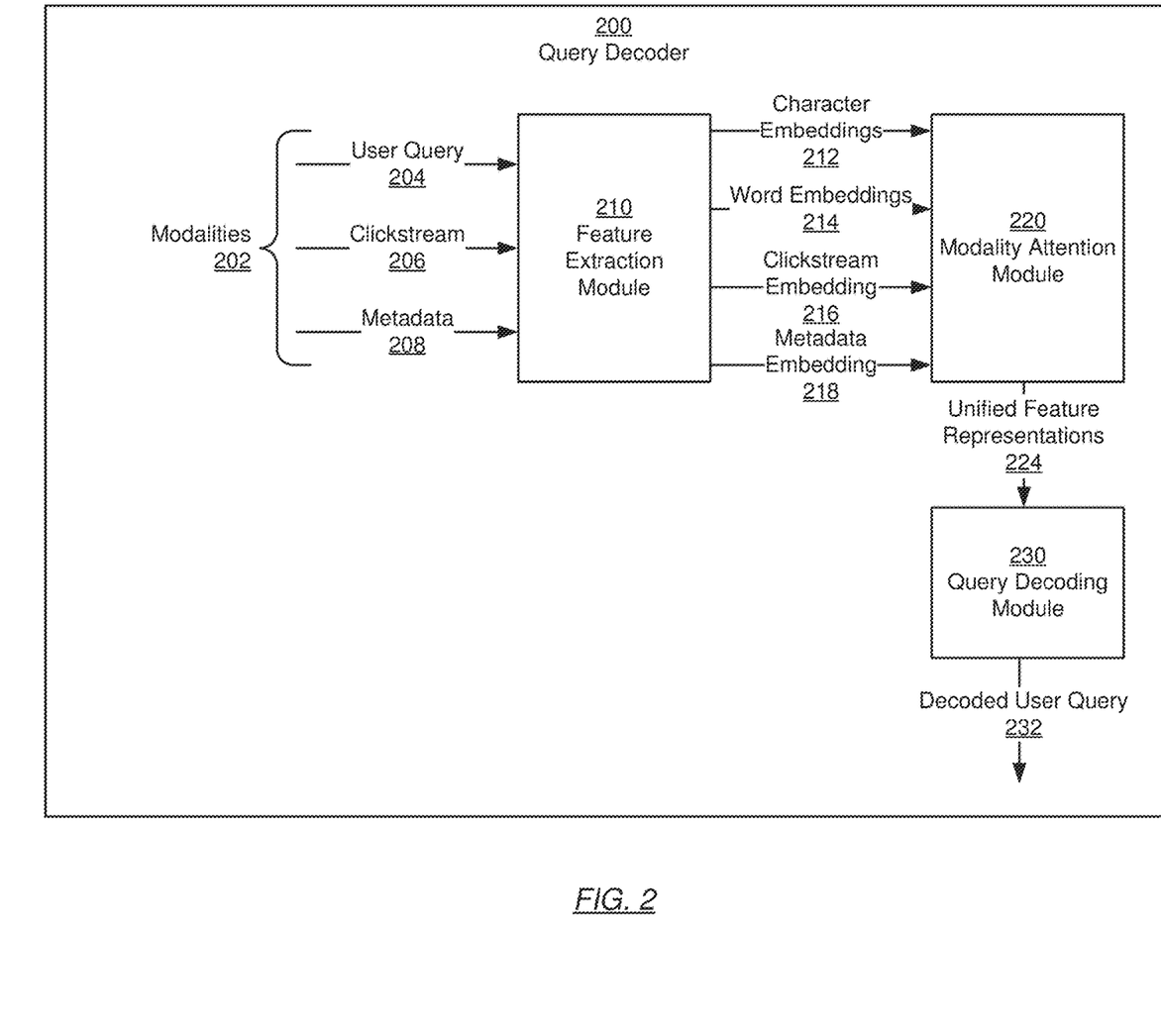
FIG. 2 shows a query decoder in accordance with one or more embodiments of the disclosure.

Turning to FIG. 2, a query decoder (200), in accordance with one or more embodiments, is shown. The query decoder (200) includes a feature extraction module (210), a modality attention module (220), and a query decoding module (230). In combination, these modules may obtain a decoded user query (232) using the modalities (202).

The modalities (202) may include the previously discussed user query (204), clickstream (206), and metadata (208). The modalities (202) may be inputs to the feature extraction module (210). The feature extraction module (210), in accordance with one or more embodiments, processes the modalities (202) to generate embeddings (212, 214, 216, 218) representing the corresponding embeddings in a vector format that allows further processing by the modality attention module (220).

Figure 3:
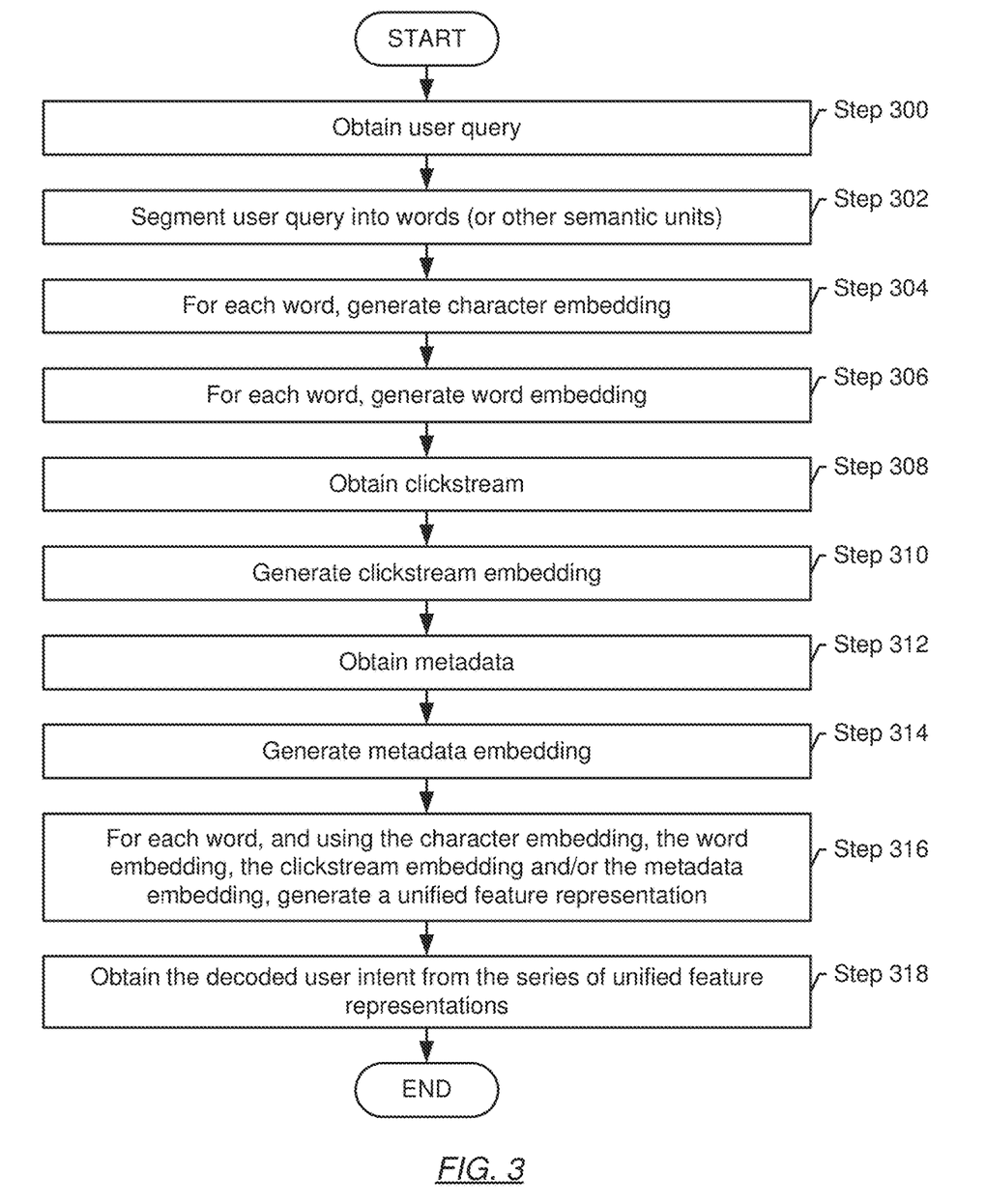
FIG. 3 shows a flowchart describing the decoding of a user query in accordance with one or more embodiments of the disclosure.

More specifically, the feature extraction module processes the use query (204) to obtain character embeddings (212) and word embeddings (214), as described in Steps 302-306 of FIG. 3. The feature extraction module further processes the clickstream (206) to obtain a clickstream embedding (216), as described in Step 310 of FIG. 3. The feature extraction module also processes the metadata (208) to obtain the metadata embedding (218), as described in Step 314 of FIG. 3. The feature extraction module (210), thus, includes a set of algorithms as further described in FIG. 3.

A character embedding (212), in accordance with one or more embodiments, is a vector representing a semantic unit of the user query (204). For example, the semantic unit may be a single word, phrase, or clause of the user query (204). Accordingly, multiple character embeddings (212) may be obtained for a user query that includes multiple words. A thorough description of character embeddings is provided with reference to Step 304 of FIG. 3.

A word embedding (214), in accordance with one or more embodiments, also is a vector representing a single word (or another type of semantic unit) of the user query (204). However, unlike the character embedding which forms the vector based on the characters of the word, the word embedding forms the vector based on the entire word. Multiple word embeddings (212) may be obtained for a user query that includes multiple words. A thorough description of word embeddings is provided with reference to Step 306 of FIG. 3.

A clickstream embedding (216), in accordance with one or more embodiments, is a vector representing a clickstream gathered as a user is interacting with a software application. A single vector may be used to encode the clickstream. A thorough description of clickstream embeddings is provided with reference to Step 310 of FIG. 3.

A metadata embedding (218), in accordance with one or more embodiments, is a vector representing metadata gathered as a user is interacting with a software application. A single vector may be used to encode the metadata. A thorough description of metadata embeddings is provided with reference to Step 312 of FIG. 3.

The embeddings (212, 214, 216, 218), in accordance with one or more embodiments, are inputs to the modality attention module (220). The modality attention module (220), in accordance with one or more embodiments, is configured to produce unified feature representations (224) that maximize an information gain obtained from modalities (202) for the purpose of obtaining an accurately decoded user query. One unified feature representation may be obtained for each combination of a word represented by a character embedding and a word embedding, and the clickstream embedding and/or the metadata embedding. The modality attention module (220) may, thus, perform a weighting of the character, word, clickstream, and metadata embeddings (212, 214, 216, 218) based on the degree of information they provide. An embedding that provides relatively little information for the purpose of decoding the user query may be attenuated, whereas an embedding that provides significant information for the purpose of decoding the user query may be amplified, when forming a unified feature representation. The unified feature representation may be obtained in vector format. The generation of uniform feature representations (224) and the implementation of the modality attention module (220) are described in detail with reference to Step 316 of FIG. 3.

The unified feature representations (224), in accordance with one or more embodiments, are inputs to the query decoding module (230). The query decoding module (230), in accordance with one or more embodiments, is configured to obtain the decoded user query (232) from the unified feature representations (224). The decoded user query (232) may, thus, be understood as an estimate of the user's intention when submitting the user query. The decoded user query (232) may be obtained in vector format. The obtaining of the user query (232) and the implementation of the query decoding module (230) are described in detail with reference to Step 318 of FIG. 3.

While FIGS. 1 and 2 show configurations of components, other configurations may be used without departing from the scope of the disclosure. For example, various components (such as the front-end and the back-end of the software application) may be combined to create a single component. As another example, the functionality performed by a single component may be performed by two or more components that may be communicatively connected using a network connection.

FIG. 3 shows a flowchart in accordance with one or more embodiments of the disclosure. While the various steps in this flowchart are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Turning to FIG. 3, a method for obtaining a decoded user query, in accordance with one or more embodiments of the disclosure, is shown. The inputs to the method may include a user query, a clickstream, and metadata. In one or more embodiments, the decoded user query is obtained from these inputs. The user query may be processed in the form of word embeddings and character embeddings, as subsequently discussed. Further, the clickstream and the metadata may be used to supplement the user query with additional context. Various steps of the method are further illustrated based on the example shown in FIG. 4. Those skilled in the art will appreciate that the disclosure is, however, not limited to the example of FIG. 4.

In Step 300, the user query is obtained. The user query may be obtained in any format such as typed or spoken language. If the user query is spoken language, the user query may be converted to text. As previously noted, the user query, in accordance with one or more embodiments, reflects a user's intent, which is to be decoded by the subsequently described method. The user query may deviate from standard natural language. For example, the user query may include typographical and/or grammatical errors, jargon, vernacular language, mispronunciations, etc.), and/or the user query may be ambiguous when considered without additional context.

The user query may be obtained as the user is interacting with the software application. The user query may be captured by an application front-end or application back-end of the software application when the user is submitting the user query, for example, in the form of a help or search request.

Figure 4:
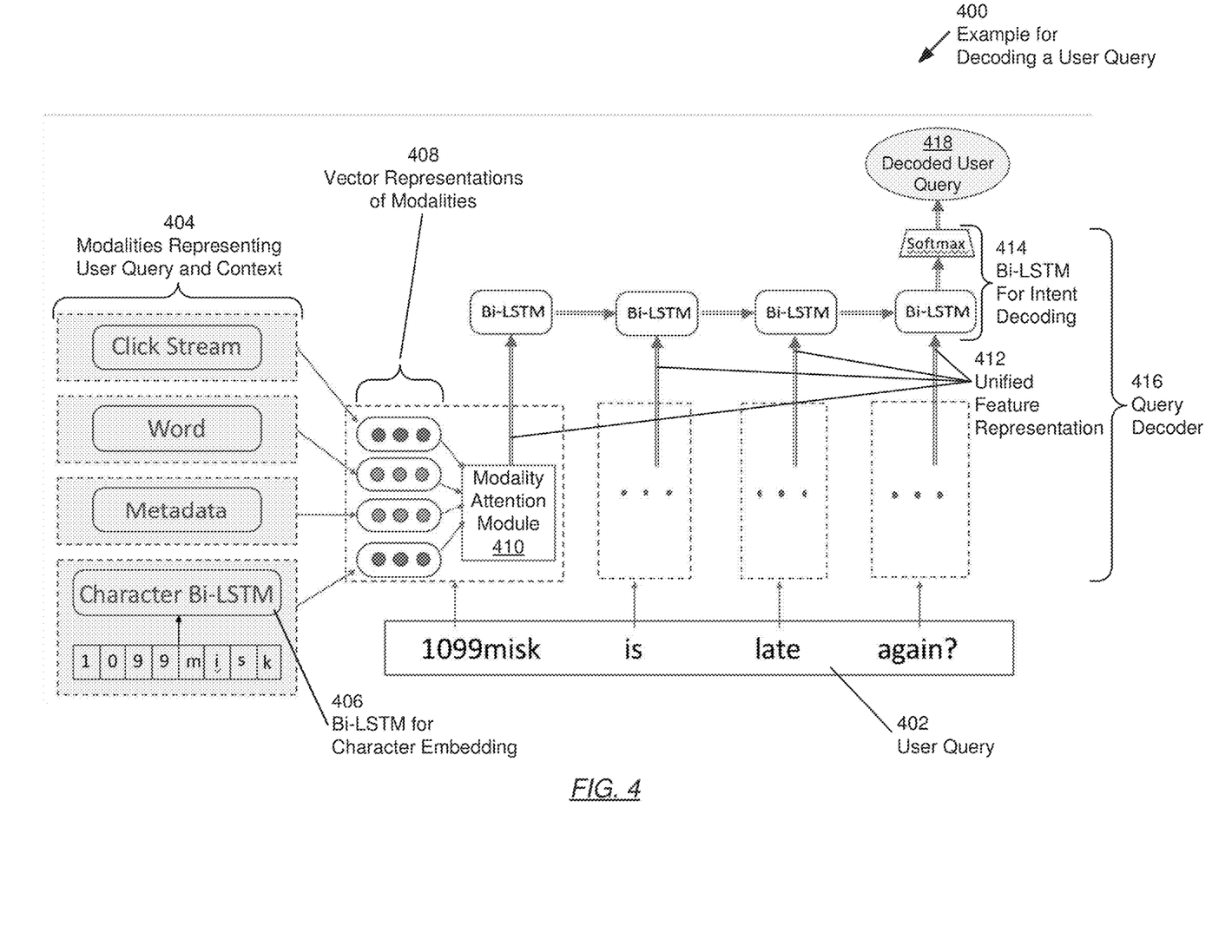
FIG. 4 shows an example for decoding a natural language query in accordance with one or more embodiments of the disclosure.

Referring to FIG. 4, the example user query is "1099misk is late again?" The user query, thus, includes typographical and grammatical errors: "1099-MISC", a form commonly used by the U.S. Internal Revenue Service, is misspelled. In addition, the question is phrased grammatically incorrectly.

In Step 302, the user query is segmented into words. Various methods may be used to perform the segmentation without departing from the disclosure. For example, words may be segmented based on spaces between words. The segmentation output is a series of words. In the example of FIG. 4, the example user query is segmented into the words "1099misk", "is", "late", and "again?" Those skilled in the art will appreciate that the user query may alternatively be segmented into other semantic units such as phrases or other combinations of words. In particular, the segmentation method may be specific to the language of the user query. If necessary, a speech-to-text conversion may be performed prior to the segmentation. The segmentation output may vary, depending on the initially provided user query. Assume, for example, that the user query includes the term "ice box". The segmentation output may be the two words "ice" and "box. Alternatively, if the user query includes the term "ice-box" the segmentation output may be either the two words "ice" and "box", or alternatively, the single word "ice-box", depending on the segmentation method being used.

In Step 304, a character embedding is generated for each word. In one or more embodiments, the character embedding is a vector representation of the corresponding word. The vector representation may have multiple or many elements, for example, 100 or more elements.

Various algorithms may be used to obtain character embeddings for words. In one or more embodiments, a deep learning-type algorithm is used. The algorithm may be, for example, a convolutional neural network (CNN). The CNN may include convolutional layers, pooling layers and fully connected layers. The CNN may accept the characters of a word as input, and may provide a classification of the word, based on a previously performed training of the CNN. This training may have been performed using backpropagation by evaluating a loss function to obtain gradients for updating weights of the CNN. A supervised corpus may be used for the training. The corpus may include non-normalized text that may include misspelled and/or abbreviated text, vernacular language, etc.

To consider the sequence of the characters in a word, a recurrent neural network (RNN) may be used as an alternative to the CNN. The RNN accepts, at the input, a sequence of vectors encoding the characters of the word to produce a sequence of vectors representing hidden layer outputs. These hidden layer output vectors may subsequently be processed by an output layer which may implement, for example, a softmax function.

A long short term memory (LSTM) recurrent neural network may be used to evaluate the sequence of vectors representing the characters of the word. In one or more embodiments of the disclosure, a bidirectional LSTM (Bi-LSTM) is used. The LSTM may evaluate the sequence of vectors representing the characters of the word in both directions.

The following implementation may be used:

$$i_t = \sigma(W_{xi}x_t + W_{hi}h_{t-1} + W_{ci}c_{t-1} + b_i),$$

$$c_t = (1-i_t) \odot c_{t-1} + i_t \tan h(W_{xc}x_t + W_{hc}h_{t-1} + b_c),$$

$$o_t = \sigma(W_{xo}x_t + W_{ho}h_{t-1} + W_{co}c_t + b_o),$$

$$h_t = o_t \odot \tan h(c_t), \quad (1)$$

where $\sigma$ is the element-wise sigmoid function, and $\odot$ is the element-wise product. For a given word $(x_1, x_2, \ldots, x_n)$ containing n characters, each represented by a vector, the LSTM computes a representation $\vec{h}_t$ of the left context of the word at every character t. Generating a representation of the right context $\overleftarrow{h}_t$ may add useful information. Accordingly, a second LSTM that reads the same sequence in reverse may be added. A forward LSTM and a backward LSTM may thus be performed by two distinct networks, thereby obtaining the Bi-LSTM. The representation of a character using this model may be obtained by concatenating left and right context representations, $\vec{h}_t = [\vec{h}_t; \overleftarrow{h}_t]$.

A softmax function or any other type activation function may subsequently be used to obtain an output in the format of a vector representing the word as a character embedding.

Backpropagation may be used to train the above implementation of the LSTM, specifically the weight matrices, based on an appropriately selected corpus.

In Step 306, a word embedding is generated for each word. In one or more embodiments, the word embedding is a vector representation of a corresponding word. The vector representation may have multiple or many elements, for example, 100 or more elements. The algorithm used for generating the word embedding may be trained using a corpus. The corpus may be a document or a collection of documents that may including general text, or text that is specific to a topic or topics, e.g., the topic to which the user query is related. Assume, for example, that the user query is obtained by a tax filing software. Accordingly, the corpus underlying the algorithm for generating word embeddings may include, for example, financial topics but not agricultural topics. Based on the corpus, an unsupervised training may be performed to obtain vector representations for words. The training may be performed based on word-word co-occurrence statistics form the corpus. Accordingly, the resulting vector representations of the words from the corpus can be used to measure linguistic or semantic similarity of the corresponding words. The similarity measurement may be performed using Euclidian distance, cosine similarity, etc. To capture additional linguistic nuances, the vector differences may be assessed when analyzing two words for similarity. Examples for algorithms used for generating the word embeddings include, but are not limited to, the GloVe algorithm and the Word2Vec algorithm. Those skilled in the art will appreciate that different algorithms for generating word embeddings and different corpora may be used without departing from the disclosure.

In one or more embodiments, the algorithm for generating word embeddings, once trained, and when applied to words, locates the vector representation associated with the word for which a word embedding is to be generated and returns this vector representation. Accordingly, for words that have not been part of the corpus when the training of the algorithm for generating word embeddings was performed, a word embedding may not be successfully obtained. Consider, for example, the word "1099misk", in FIG. 4. Here, the identification of a word embedding may fail because a corpus used for training the algorithm for generating word embeddings is unlikely to include this particular misspelling of the term "1099-MISC".

In one or more embodiments, after the execution of Steps 304 and 306, two different representations of the words forming the user query are available: a word representation based on a character embedding and a word representation based on a word embedding. Character embeddings may provide superior performance thus supplementing the word embeddings in certain situations. Specifically, character embeddings may be formed for any word, including previously unseen words and misspelled words. Further, character embeddings may be superior when applied to infrequent words.

In Step 308, a clickstream is obtained. As previously described with reference to FIGS. 1 and 2, the clickstream may provide context facilitating the decoding of the user query. The clickstream that is obtained may be a result of recording the user's activity over a time interval prior to receiving the user query.

In Step 310, a clickstream embedding is generated from the clickstream. In one or more embodiments, the clickstream embedding is a vector representation of the clickstream. The vector representation may have multiple or many elements, for example, 100 or more elements. The clickstream embedding may be generated using algorithms analogous to the algorithms used for generating character or word embeddings (Steps 304 and 306). Specifically, the individual entries in the clickstream are categorical variables and may, thus, be treated analogous to text (letter, tokens, words, etc.). Consider the previously introduced example of the clickstream ["incomeexplore", "s1040perbfdi8858", "2017deductionscredits", "deductionsguideme"] where the screen IDs form a sequence of categorical variables. These screen IDs may be processed using, for example, an LSTM recurrent neural network such as the one used for obtaining character embeddings (Step 304). Historically observed sequences of screen IDs obtained from click streams gathered over time may form the corpus used for training this LSTM recurrent neural network.

In Step 312, metadata is obtained. As previously described with reference to FIGS. 1 and 2, the metadata may provide context facilitating the decoding of the user query. The metadata that is obtained may be a result of recording the user's activity over a time interval prior to receiving the user query.

In Step 314, a metadata embedding is generated from the metadata. In one or more embodiments, the metadata embedding is a vector representation of the metadata. The vector representation may have multiple or many elements, for example, 100 or more elements. The metadata embedding may be generated using algorithms analogous to the algorithms used for generating character or word embeddings (Steps 304 and 306). Metadata that is initially non-categorical may need to be converted to categorical variables to allow treatment analogous to text (letter, tokens, words, etc.). Consider the previously introduced example of metadata obtained from a tax preparation software application. In the tax preparation software application, many entries are numbers (i.e., numeric entries). For example, a user may provide a value for income, taxes withheld, etc. To convert the numeric entries to categorical variables, the numbers may be arranged in a set number of classes or groups. Consider the example of the income "$58,900" received as a number. Historically observed incomes may have been used to establish the following income groups: Income Group 1: $0 . . . $9,999; Income Group 2: $10,000 . . . $19,999; Income Group 3: $20,000 . . . $49,999; Income Group 4: $50,000 . . . $199,999; Income Group 5: $200,000+. Accordingly, the received income would be assigned to Income Group 4, to obtain a categorical variable "income_group_4". The metadata may be processed using, for example, an LSTM recurrent neural network such as the one used for obtaining character embeddings (Step 304). Historically observed metadata may form the corpus used for training the LSTM recurrent neural network.

After the execution of Steps 300-314, vector representations of the modalities, including character, word, clickstream and metadata embeddings, are available. The vectors representing the modalities may all have the same dimension, enabling execution of the next steps to eventually decode the user query.

In Step 316, for each word, and using the associated character embedding, the associated word embedding, the clickstream embedding, and/or the metadata embedding, a unified feature representation is generated. In one or more embodiments of the disclosure, the unified feature representation is a vector that includes the aggregate knowledge obtained from the character embedding, the word embedding, the clickstream embedding, and/or the metadata embedding. The contributions of the character embedding, the word embedding, the clickstream embedding, and/or the metadata embedding may be weighted, based on their importance. Consider the example shown in FIG. 4. In the user query "1099misk is late again?", the first word is misspelled. Accordingly, a word embedding for "1099misk" is unlikely to be particularly informative. In contrast, a character embedding for "1099misk", due to the proximity to "1099-MISC", is likely to provide valuable information for the purpose of decoding the user query. Accordingly, in the example, the weight associated with the word embedding for "1099misk" would be relatively low, whereas the weight associated with the character embedding would be relatively high.

Step 316 may be performed for each word of the user query, while using the same context provided by the clickstream embedding and/or the metadata embedding. Referring to the example of FIG. 4, a first unified feature representation is obtained for the word "1099misk" using the character embedding and the word embedding for "1099misk" in combination with the clickstream embedding and/or the metadata embedding. A second unified feature representation is obtained for the word "is" using the character embedding and the word embedding for "is" in combination with the clickstream embedding and/or the metadata embedding. A third unified feature representation is obtained for the word "late" using the character embedding and the word embedding for "late" in combination with the clickstream embedding and/or the metadata embedding. A fourth unified feature representation is obtained for the word "again?" using the character embedding and the word embedding for "again?" in combination with the clickstream embedding and/or the metadata embedding.

The unified feature representation is a context vector that includes the aggregate knowledge obtained from a character embedding, a word embedding, the clickstream embedding, and/or the metadata embedding. The method, thus, adaptively attenuates or amplifies the available modalities (the character embedding, word embedding, clickstream embedding and/or metadata embedding) to maximize information gain, as subsequently discussed.

The following implementation may be used:

$$[a_t^{(word)}, a_t^{(char)}, a_t^{(click)}, a_t^{(meta)}] = \quad (2)$$
$$\sigma\left(W_m \cdot [x_t^{(word)}; x_t^{(char)}; x_t^{(click)}; x_t^{(meta)}]\right) + b_m,$$

$$\alpha_t^{(m)} = \frac{\exp(a_t^{(m)})}{\sum_{m' \in \{word, char, click, meta\}} \exp(a_t^{(m')})}$$

$$\forall m \in \{word, char, click, meta\},$$

$$\bar{x}_t = \sum_{m \in \{word, char, click, meta\}} \alpha_t^{(m)} x_t^{(m)},$$

where $x = \{x_t\}_{t=1}^{T}$ is a sequence of input tokens with length T. In the example of FIG. 4, T=4. Each input token is composed of the four modalities $x_t = \{x_t^{(word)}, x_t^{(char)}, x_t^{(click)}, x_t^{(meta)}\}$ for word, character, clickstream, and metadata embeddings, obtained as described in Steps 304, 306, 310, and 314. $\alpha_t = [\alpha_t^{(word)}; \alpha_t^{(char)}; \alpha_t^{(click)}; \alpha_t^{(meta)}]$ is an attention vector at each decoding step t, and $\bar{x}_t$ is a final context vector at t that maximizes the information gain for $x_t$.

The method described by Eq. 2, thus, adaptively attenuates or amplifies each modality as a whole at each decoding step t, based on the coefficients of $W_m$, and produces a soft-attended context vector $\bar{x}_t$. $W_m$ is set prior to use of Eq 2 using backpropagation training based on a corpus of historical data which may have been collected during previous use of the software application.

The series of unified feature representations in $\bar{x}_t$ for t=1 . . . T may be provided to the query decoding module to decode the user query, in Step 318. Those skilled in the art will appreciate that while the method describes the use of word, character, clickstream, and metadata embeddings, any other combination of embeddings may be used without departing from the disclosure. For example, word, character, and clickstream embeddings or word, character, and metadata embeddings may be used.

In Step 318, the user query is decoded from the unified feature representations that were obtained for all words of the user query. In one or more embodiments of the disclosure, the decoded user query is a vector. The decoded user query may subsequently be used in additional steps to address the user query by, for example, providing a response to the user query, executing a command, etc.

A recurrent neural network (RNN) may be used to decode the user query. In one or more embodiments of the disclosure, a Bi-LSTM analogous to the previously described Bi-LSTM used to obtain character embeddings (Eq. 1) is employed.

The following implementation may be used:

$$i_t = \sigma(W_{xi} h_{t-1} + W_{ci} c_{t-1}),$$

$$c_t = (1-i_t) \odot c_{t-1} + i_t \tan h(W_{xc} x_t + W_{hc} h_{t-1}),$$

$$o_t = \sigma(W_{xo} \bar{x}_t + W_{ho} h_{t-1} + W_{co} c_t),$$

$$h_t = \text{LSTM}(\bar{x}_t) = o_t \odot \tan h(c_t). \quad (3)$$

Analogous to Eq. 1, the LSTM may process the inputs $\bar{x}_t$ in forward and backward directions to obtain $\bar{h}_t$. A softmax function or any other type of activation function may subsequently be applied to $\bar{h}_t$ to obtain the decoded user query in vector format. Prior to executing Step 318, The LSTM of Eq. 3 is trained using backpropagation, based on a corpus of historical data which may have been collected during previous use of the software application.

After completion of Step 318, the user query may be processed, based on the decoded user query. For example, a search ranker may be used to obtain search results in response to the user query, commands specified in the user query may be executed, etc.

Turning to FIG. 4, the example for decoding a user query (400), referred to throughout the discussion of FIG. 3 for the purpose of illustrating execution of various steps of the described method, is shown. In the example, a user query (402) is obtained as described in Step 300. After segmenting the user query into words (Step 302), generating character embeddings (Step 304), generating word embeddings (Step 306), obtaining the clickstream (Step 308), generating the clickstream embeddings (Step 310), obtaining metadata (Step 312), and generating the metadata embedding (Step 314), the modalities (404) representing the user query and the context are available for further processing. A Bi-LSTM (406) is used to generate the character embeddings. The resulting vector representations (408) of the modalities are provided to the modality attention module (410) to establish unified feature representations (412) in each of the four decoding steps (Step 316). The unified feature representations (412) are subsequently used to decode the user query (418). The decoding is performed by a Bi-LSTM followed by a Softmax function (414) (Step 318).

Figure 5:
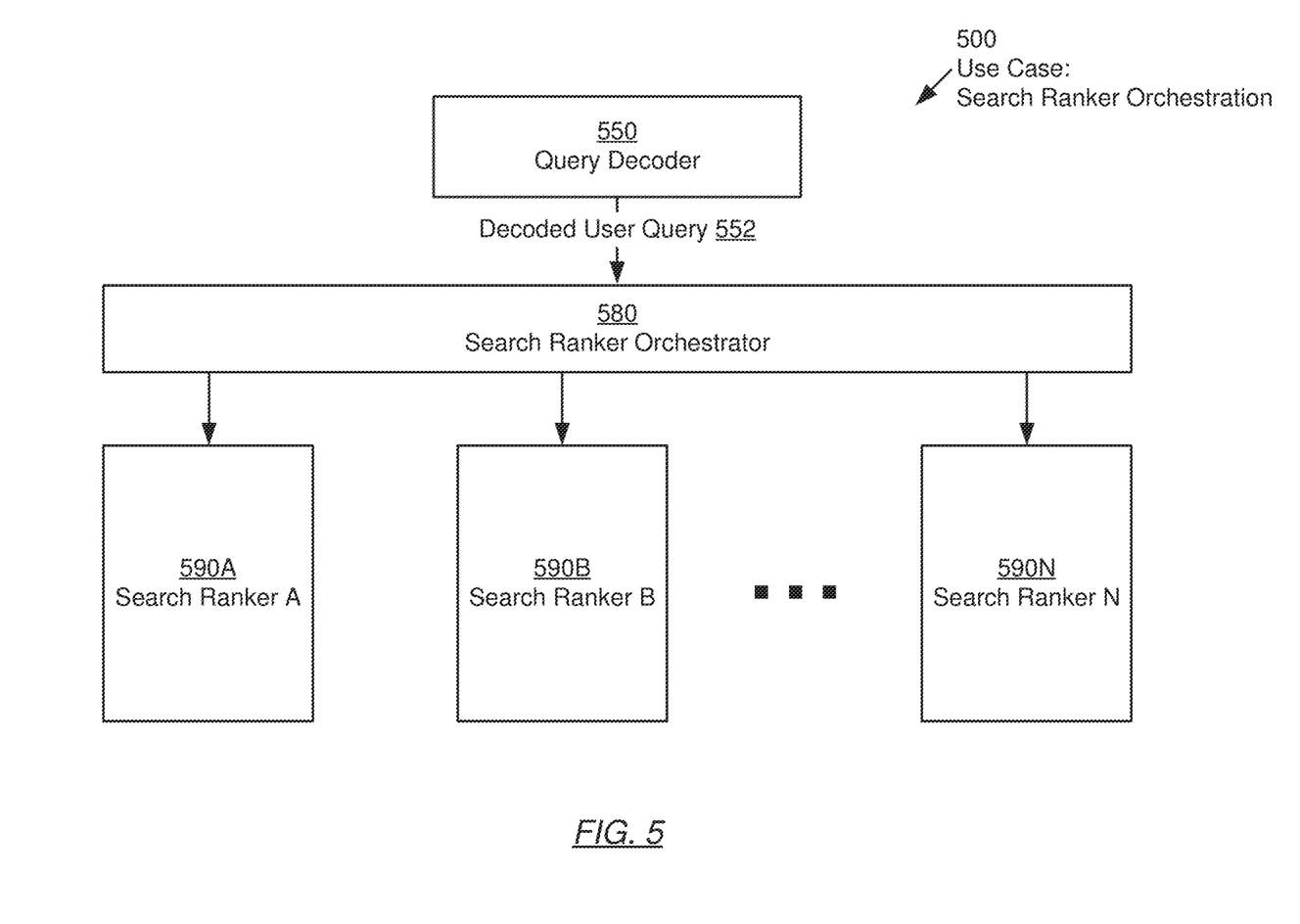
FIG. 5 shows a use case for search ranker orchestration based on a decoded user query, in accordance with one or more embodiments of the disclosure.

Turning to FIG. 5, a use case scenario (500) is shown. In the use case scenario, a decoded user query (552) obtained from a query decoder (550) is used to orchestrate search rankers (590A-590N). Assume that a user is submitting a search request. The search request could be, for example, a customer support request directed to the software application or a feature of the software application that the user is accessing. In the use case scenario (500), the query decoder (550) obtains a decoded user query (552) from an originally submitted user query. Assume that depending on the decoded user query (552), different search rankers (590A-590N) may be preferred to obtain a quality response to the search request. This may be the case for various reasons.

Consider for example, a family of software packages in the domains of finance, accounting and tax preparation. While these domains have commonalities, specialized search rankers may, nevertheless, be used: One search ranker may be particularly suitable to answer accounting-related search requests, another search ranker may be particularly suitable to answer tax-related search requests, etc. Additionally, search rankers may be specific to particular versions of the software application, particular languages, etc. Up to tens or even hundreds of search rankers (590A-590N) may be available. Accordingly, in the use case (500), a search ranker orchestrator (580) is used to route the search request to the search ranker that is most likely to provide a quality response (by maximizing the quality of the search result) to the search request.

The search ranker orchestrator (580), in accordance with one embodiment of the disclosure, is a classifier that, based on the decoded user query (552), routes the search request (in the form of the decoded user query (552)) to one of the search rankers (590A-590N). The search ranker orchestrator (580) may be any type of classifier, such as a logistic regression, a random forest, a support vector machine, or a deep learning algorithm as previously described. Regardless of the type of classifier being used, the input to the classifier is the decoded user query (552). Accordingly, the classifier may benefit from the availability of the modalities that were initially considered when obtaining the decoded user query. The likeliness of routing the search request to the most suitable search ranker may thus increase, in comparison to approaches that merely consider a user query without context.

Each of the search rankers (590A-590N) may be domain specific, as previously noted. Assume that the search rankers are configured to return search results that are support documents such as help texts. A search ranker that is dedicated to accounting topics may thus be trained using pairs of accounting-specific documents and the corresponding user queries including other available modalities such as clickstream and/or metadata. This search ranker may, thus, perform better than a single general-purpose search ranker not only because the search ranker is domain specific, but also because the classification task performed by the search ranker considers context (e.g., based on clickstream and/or metadata) in addition to the user query itself. The search rankers (590A-590N) may be based on any type of classification algorithm, such as a logistic regression, a random forest, a support vector machine, or a deep learning algorithm as previously described. When training a search ranker, a cost function may be chosen to achieve a particular goal such as task completion or any other business goal.

Various embodiments of the disclosure have one or more of the following advantages. Embodiments of the disclosure map heterogenous modalities into a single joint embedding space. The decoding of the user query is performed in this single joint embedding space. Accordingly, different types of information may be considered, based on their availability. Absence of a particular modality or a flawed modality (e.g., caused by typographical and/or grammatical errors in the user query), therefore, do not adversely affect the decoding of the user query. The additional modalities (including clickstream and/or metadata) may help resolve ambiguities in the user query.

One or more embodiments of the disclosure improve computing systems by enabling them to interpret natural language, even when that natural language includes non-standard elements such as typographical and/or grammatical errors, jargon, vernacular language, mispronunciations, etc.

Further, embodiments of the disclosure enable computing system to consider a context to properly interpret the user query.

Embodiments of the disclosure may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6A:
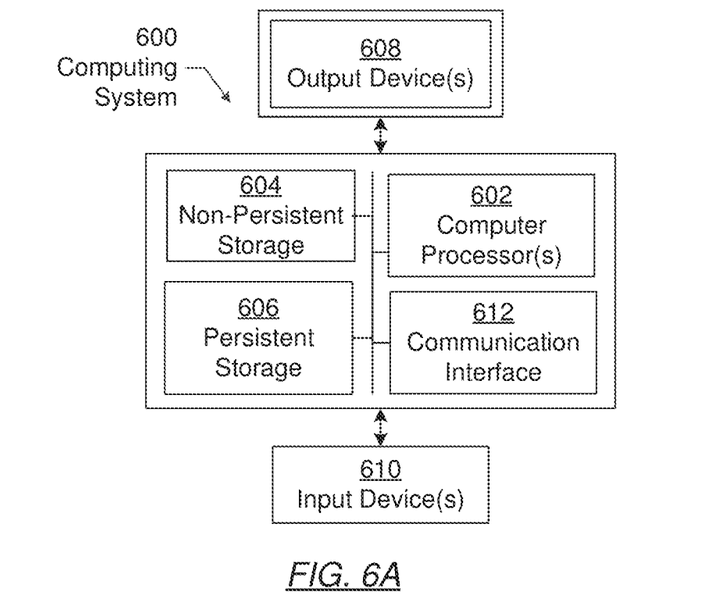
FIGS. 6A and 6B show computing systems in accordance with one or more embodiments of the disclosure.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Figure 6B:
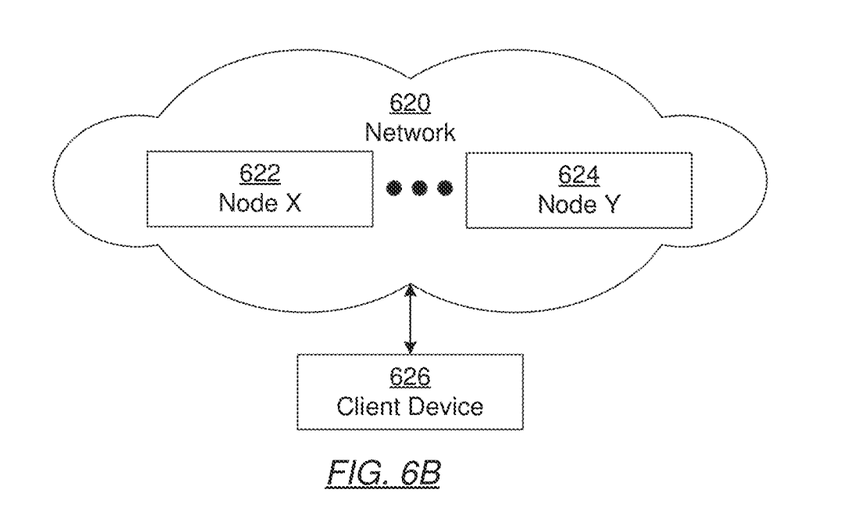

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for decoding a natural language user query, the method comprising:
obtaining the user query submitted by a user of a software application;
segmenting the user query into a plurality of words;
generating a character embedding for each word of the plurality of words;
generating a word embedding for each word of the plurality of words;
obtaining a clickstream from tracked clicks of the user, wherein the clickstream captures one or more interactions of the user with the software application occurring within a time interval prior to the submission of the user query;
generating a clickstream embedding from the clickstream;
for each of the words, generating a unified feature representation based on:
the character embedding and the word embedding for each of the words; and
the clickstream embedding;
decoding the unified feature representations to obtain a decoded user query; and
processing the user query using the decoded user query.

2. The method of claim 1, further comprising:
obtaining metadata based on the clicks of the user;
generating a metadata embedding from the metadata; and
generating the unified feature representation using the metadata.

3. The method of claim 1, wherein generating the unified feature representation comprises:
weighting the character embedding, the word embedding, and the clickstream embedding to maximize an information gain for obtaining the decoded user query; and
combining the weighted character embedding, the weighted word embedding and the weighted clickstream to form the unified feature representation.

4. The method of claim 3,
wherein a weighting matrix is used to weight the character embedding, the word embedding, and the clickstream embedding, and
wherein the weighting matrix is trained using historical data to maximize the information gain.

5. The method of claim 1, wherein the unified feature representation comprises an aggregate knowledge based on the character embedding, the word embedding and the clickstream embedding.

6. The method of claim 1, wherein obtaining the decoded user query from the unified feature representation comprises sequential processing of the unified feature representation for each of the words by a recurrent neural network.

7. The method of claim 6, wherein the sequential processing is performed in a forward direction and in a backward direction.

8. The method of claim 1, wherein generating the character embedding comprises obtaining a vector representation of the word using machine learning based on a corpus that includes non-normalized text.

9. The method of claim 1, wherein processing the user query comprises:
using the decoded user query as input to a search ranker; and
obtaining, from the search ranker, a search result based on the decoded user query.

10. The method of claim 1, further comprising:
selecting, by a search ranker orchestrator, from a plurality of search rankers, a search ranker expected to maximize a quality of a search result; and
obtaining, the search result using the selected search ranker, based on the decoded user query.

11. A system for decoding a natural language query, the system comprising:
- a computer processor; and
- an application back-end executing on the computer processor configured to:
  - obtain the user query submitted by a user of a software application;
  - segment the user query into a plurality of words;
  - generate a character embedding for each word of the plurality of words;
  - generate a word embedding for each word of the plurality of words;
  - obtain a clickstream from tracked clicks of the user,
    - wherein the clickstream captures one or more interactions of the user with the software application occurring within a time interval prior to the submission of the user query;
  - generate a clickstream embedding from the clickstream;
- a query decoder configured to:
  - for each of the words, generate a unified feature representation based on:
    - the character embedding and the word embedding for each of the words; and
    - the clickstream embedding;
  - decode the unified feature representations to obtain a decoded user query; and
- a query response engine configured to process the user query using the decoded user query.

12. The system of claim 11, wherein generating the unified feature representation comprises:
- weighting the character embedding, the word embedding, and the clickstream embedding to maximize an information gain for obtaining the decoded user query; and
- combining the weighted character embedding, the weighted word embedding and the weighted clickstream to form the unified feature representation.

13. The system of claim 12,
- wherein a weighting matrix is used to weight the character embedding, the word embedding, and the clickstream embedding, and
- wherein the weighting matrix is trained using historical data to maximize the information gain.

14. The system of claim 11, wherein obtaining the decoded user query from the unified feature representation comprises sequential processing of the unified feature representation for each of the words by a recurrent neural network.

15. The system of claim 11, wherein generating the character embedding comprises obtaining a vector representation of the word using machine learning based on a corpus that includes non-normalized text.

16. A non-transitory computer readable medium comprising computer readable program code for decoding a natural language query, the computer readable program code causing a computer system to:
- obtain the user query submitted by a user of a software application;
- segment the user query into a plurality of words;
- generate a character embedding for each word of the plurality of words;
- generate a word embedding for each word of the plurality of words;
- obtain a clickstream from tracked clicks of the user,
  - wherein the clickstream captures one or more interactions of the user with the software application occurring within a time interval prior to the submission of the user query;
- generate a clickstream embedding from the clickstream;
- for each of the words, generate a unified feature representation based on:
  - the character embedding and the word embedding for each of the words; and
  - the clickstream embedding;
- decode the unified feature representations to obtain a decoded user query; and
- process the user query using the decoded user query.

17. The non-transitory computer readable medium of claim 16, wherein generating the unified feature representation comprises:
- weighting the character embedding, the word embedding, and the clickstream embedding to maximize an information gain for obtaining the decoded user query; and
- combining the weighted character embedding, the weighted word embedding and the weighted clickstream to form the unified feature representation.

18. The non-transitory computer readable medium of claim 17,
- wherein a weighting matrix is used to weight the character embedding, the word embedding, and the clickstream embedding, and
- wherein the weighting matrix is trained using historical data to maximize the information gain.

19. The non-transitory computer readable medium of claim 16, wherein obtaining the decoded user query from the unified feature representation comprises sequential processing of the unified feature representation for each of the words by a recurrent neural network.

20. The non-transitory computer readable medium of claim 16, wherein generating the character embedding comprises obtaining a vector representation of the word using machine learning based on a corpus that includes non-normalized text.

* * * * *